UNITED STATES PATENT OFFICE.

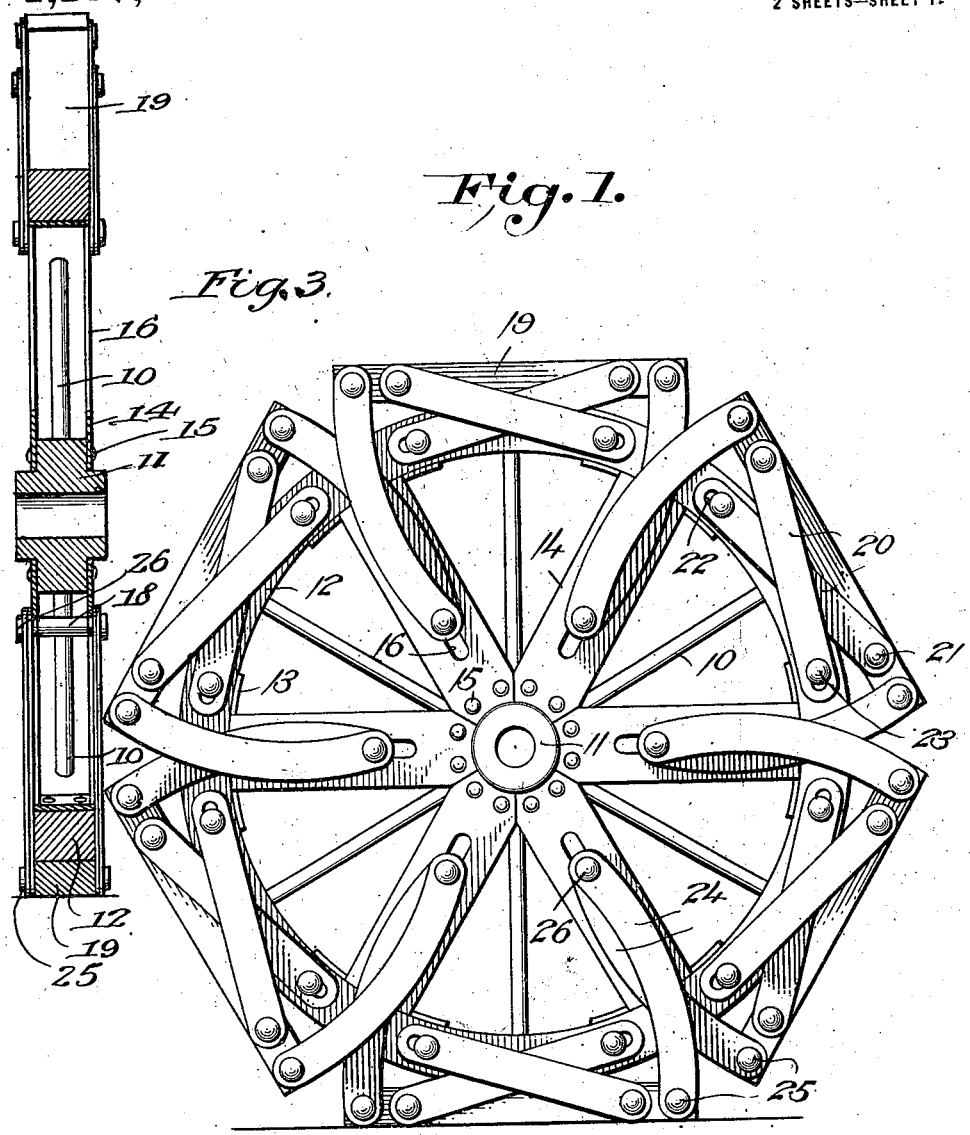

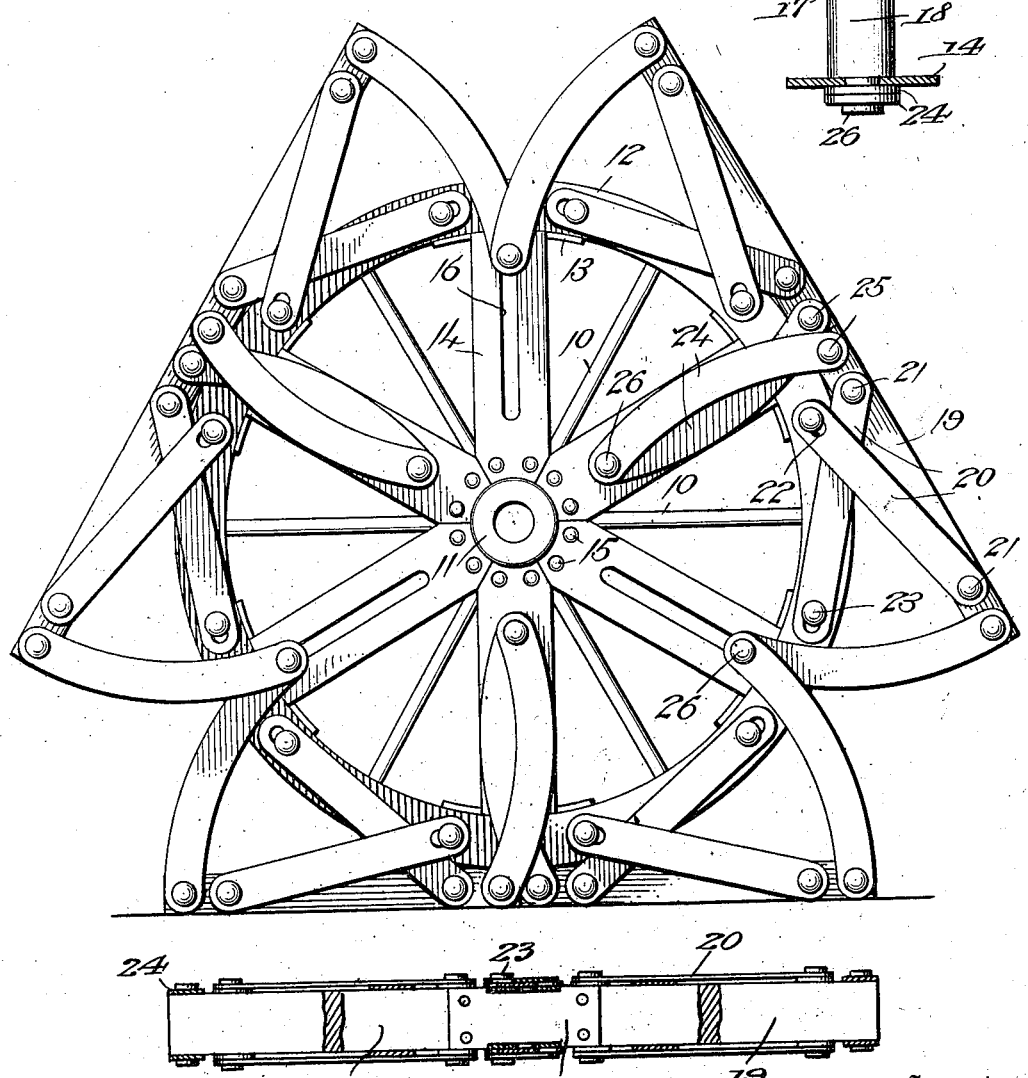

THOMAS B. CRABTREE, OF HANFORD, CALIFORNIA.

TRACTION-WHEEL.

1,157,151.  Specification of Letters Patent.  Patented Oct. 19, 1915.

Application filed July 30, 1914. Serial No. 854,175.

*To all whom it may concern:*

Be it known that I, THOMAS B. CRABTREE, a citizen of the United States, residing at Hanford, in the county of Kings and State of California, have invented certain new and useful Improvements in Traction-Wheels, of which the following is a specification.

This invention relates to an improved traction wheel and the principal object of the invention is to provide improved means for movably connecting shoes with the wheel, thus permitting the shoes to successively move in engagement with the ground and form a track for the wheels to run upon.

Another object of the invention is to so mount the shoes that during the rotation of the wheel there will be one shoe resting upon the ground during part of the rotation and two shoes resting upon the ground the remainder of the time.

Another object of the invention is to so mount the shoes that they will be lifted from the ground by links which connect the shoes with the rim of the wheel and guided in their movement by other links slidably connected with slotted plates extending from the rim of the wheel toward the hub thereof.

This invention is illustrated in the accompanying drawings, wherein—

Figure 1 is a side elevation showing the improved traction wheel with one shoe resting upon the ground; Fig. 2 is a view similar to Fig. 1 with two of the shoes resting upon the ground; Fig. 3 is a vertical sectional view through the improved wheel taken along the line 3—3 of Fig. 2; Fig. 4 is a transverse sectional view through the wheel taken along the line 4—4 of Fig. 2; Fig. 5 is a fragmentary sectional view through one of the spokes taken along the line 5—5 of Fig. 2.

The spokes 10 of this wheel radiate from the hub 11 and have their outer ends engaging the rim 12 to which the plates 13 are secured. These plates 13 are secured to the inner face of the rim and are provided with side arms 14 which extend to the hub and have their inner ends secured to the same by means of the rivets or bolts 15. These side arms are provided with longitudinally extending slots 16 in which the reduced ends 17 of the pins 18 are slidably mounted. The shoes 19 are placed about the rim 12 and are provided with supporting links 20 which have their outer ends pivotally connected with the shoes by means of the rivets or bolts 21 and have their inner ends provided with elongated openings or slots 22 through which the rivets or bolts 23 pass to pivotally and slidably connect the links with the rim. Guiding links 24 which are curved longitudinally have their outer end portions pivotally connected with the end portions of the shoes by means of the bolts or rivets 25 and have their inner end portions rotatably mounted upon the reduced ends 17 of the pins 18 and held in place by the enlarged heads 26.

When the wheel is in motion it will rotate and will successively move from the position shown in Fig. 1 to the position shown in Fig. 2 and then from the position shown in Fig. 2, back to the position shown in Fig. 1. As the wheel moves from the position shown in Fig. 1 to the position shown in Fig. 2, the shoe shown to the right of the one resting upon the ground in Fig. 1 will move into engagement with the ground. At the same time the outer guiding links of the two shoes mentioned will slide toward the rim to the position shown in Fig. 2 and the inner guiding links will move to the position shown in Fig. 2. As the wheel continues its rotation, the shoe which rests upon the ground at the left of Fig. 2 will be carried upwardly by its outer guiding links and also by its links 20. At the same time, another shoe will be moved toward the ground and will rest upon the ground after the left-hand shoe, shown in Fig. 2, has been raised. It will therefore be seen that the rim of the wheel does not come in contact with the ground and therefore this wheel may move over soft ground without sinking into the same. It will also be noted that this device can be easily connected with the wheels of traction engines or of any vehicle which is already in use since it is only necessary to connect the plates 13 with the rim and arms 14 with the hub and then connect the links 20 with the rim. A very convenient attachment has therefore been provided for wheels which will permit the same to pass over soft ground into which the wheels would otherwise sink.

What is claimed is:—

1. A wheel including a hub and a rim, plates secured to said rim, slotted arms extending from said plates and connected with said hub, shoes positioned about said rim, links pivotally connected with said shoes and slidably connected with said rim, pins slidably mounted in the slots of said arms, and curved links pivotally connected with said shoes and rotatably mounted upon said pins.

2. A wheel including a hub and a rim, slotted arms extending from said hub to said rim, shoes positioned about said rim, links pivotally connected with said shoes and slidably connected with said rim, pins slidably mounted in the slots of said arms, and links pivotally connected with said shoes and rotatably mounted upon said pins.

3. A wheel including a hub and a rim, arms extending from said rim to said hub, shoes positioned about said rim, links pivotally connected with said shoes and slidably connected with said rim, and links pivotally connected with said shoes and slidably connected with said arms.

4. A wheel including a hub and a rim, supporting members extending from said rim to said hub, shoes positioned about said rim, rigid members pivotally connected with said shoes and slidably connected with said rim, and rigid guiding members pivotally connected with said shoes and slidably connected with said supporting members.

5. A wheel attachment comprising shoes, supporting members, guiding members pivotally connected with said shoes and slidably connected with said supporting members, and other supporting members pivotally connected with said shoes and having their opposite end portions adapted for sliding engagement with a wheel.

6. A wheel attachment of the character described, comprising shoes, links pivotally connected with said shoes and having their opposite end portions adapted for sliding engagement with a wheel, other links pivotally connected with said shoes, and means for slidably connecting said last mentioned links with a wheel.

7. An attachment of the character described comprising shoes, links pivotally connected with said shoes and having their opposite end portions adapted for sliding connection with a wheel whereby they may slide circumferentially of the wheel, other links pivotally connected with said shoes, and means for slidably connecting the inner end portions of said second links with a wheel whereby the second links may slide radially of the wheel.

In testimony whereof I affix my signature in presence of two witnesses.

THOMAS B. CRABTREE.

Witnesses:
J. W. FERGUSON,
W. J. CROUCH.

Copies of this patent may be obtained for five cents each, by addressing the "Commissioner of Patents, Washington, D. C."